United States Patent
Ortiz et al.

(10) Patent No.: US 10,577,964 B2
(45) Date of Patent: Mar. 3, 2020

(54) COOLED COOLING AIR FOR BLADE AIR SEAL THROUGH OUTER CHAMBER

(71) Applicant: UNITED TECHNOLOGIES CORPORATION, Farmington, CT (US)

(72) Inventors: Jonathan Ortiz, El Centro, CA (US); Raymond Surace, Newington, CT (US); Renee J. Jurek, Colchester, CT (US); Tracy A. Propheter-Hinckley, Manchester, CT (US)

(73) Assignee: United Technologies Corporation, Farmington, CO (US)

( * ) Notice: Subject to any disclaimer, the term of this patent is extended or adjusted under 35 U.S.C. 154(b) by 393 days.

(21) Appl. No.: 15/475,656

(22) Filed: Mar. 31, 2017

(65) Prior Publication Data
US 2018/0283195 A1 Oct. 4, 2018

(51) Int. Cl.
*F01D 11/24* (2006.01)
*F01D 11/20* (2006.01)
(Continued)

(52) U.S. Cl.
CPC ............. *F01D 11/20* (2013.01); *F01D 5/02* (2013.01); *F01D 9/065* (2013.01); *F01D 11/24* (2013.01);
(Continued)

(58) Field of Classification Search
CPC . F01D 11/20; F01D 11/24; F01D 5/02; F01D 9/065; F02C 9/18; F02C 3/04; F04D 29/542
See application file for complete search history.

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

European Search Report for EP Application No. 18165234.8 dated Aug. 6, 2018.
(Continued)

*Primary Examiner* — Dwayne J White
*Assistant Examiner* — Sabbir Hasan
(74) *Attorney, Agent, or Firm* — Carlson, Gaskey & Olds, P.C.

(57) ABSTRACT

A gas turbine engine according to an example of the present disclosure include a compressor section, a combustor, and a turbine section. The combustor has a radially outer surface that defines a diffuser chamber radially outwardly of the combustor. The turbine section has a high pressure turbine first stage blade that has an outer tip, and a blade outer air seal positioned radially outwardly of the outer tip. A tap for tapping air has been compressed by the compressor and is passed through a heat exchanger. The air downstream of the heat exchanger passes through at least one pipe and into a manifold radially outward of the blade outer air seal, and then passes across the blade outer air seal to cool the blade outer air seal.

18 Claims, 3 Drawing Sheets

(51) Int. Cl.
  *F02C 3/04* (2006.01)
  *F01D 5/02* (2006.01)
  *F02C 9/18* (2006.01)
  *F04D 29/54* (2006.01)
  *F01D 9/06* (2006.01)

(52) U.S. Cl.
  CPC ............... *F02C 3/04* (2013.01); *F02C 9/18* (2013.01); *F04D 29/542* (2013.01); F05D 2220/32 (2013.01); F05D 2240/35 (2013.01); F05D 2260/213 (2013.01); F05D 2300/50212 (2013.01); Y02T 50/676 (2013.01)

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,882,902 A | 11/1989 | Reigel et al. | |
| 5,048,288 A * | 9/1991 | Bessette | F01D 11/24 |
| | | | 415/116 |
| 5,056,335 A | 10/1991 | Renninger et al. | |
| 5,269,135 A | 12/1993 | Vermejan et al. | |
| 5,305,616 A | 4/1994 | Coffinberry | |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 * | 11/2010 | Seitzer | F01D 11/24 |
| | | | 60/782 |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 * | 1/2016 | Suciu | F02C 7/06 |
| | | | 60/772 |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0177830 A1 * | 6/2016 | Guardi | F01D 5/18 |
| | | | 60/782 |
| 2016/0215732 A1 | 7/2016 | Malecki | |
| 2016/0237906 A1 | 8/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204736 A1 * | 7/2017 | Varney | F01D 11/24 |
| 2017/0204787 A1 | 7/2017 | Duesler et al. | |

FOREIGN PATENT DOCUMENTS

| | | |
|---|---|---|
| EP | 0469825 | 2/1992 |
| EP | 0608142 | 7/1994 |

(56) References Cited

FOREIGN PATENT DOCUMENTS

| EP | 0903484 | 3/1999 |
| --- | --- | --- |
| EP | 1314872 | 5/2003 |
| EP | 1630385 A2 | 3/2006 |
| EP | 1923539 A2 | 5/2008 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.

* cited by examiner

COOLED COOLING AIR FOR BLADE AIR SEAL THROUGH OUTER CHAMBER

BACKGROUND OF THE INVENTION

This application relates to the supply of high pressure cooling air to a blade outer air seal through an outer diameter chamber.

Gas turbine engines are known and typically include a fan delivering air into a bypass duct as propulsion. The fan also delivers air into a compressor where air is compressed and then delivered into a combustor. The air is mixed with fuel and ignited in the combustor. Products of this combustion pass downstream over turbine rotors driving them to rotate. The turbine rotors, in turn, rotate compressor rotors and the fan rotor.

As can be appreciated, many components in the turbine section see very high temperatures. Two such components would be the turbine blades and blade outer air seals. Blade outer air seals typically sit radially outwardly of the blades and maintain clearance to increase the efficient use of the products of combustion.

One type of blade outer air seal is a so-called self-acting clearance control blade outer air seal. In such a blade outer air seal, two components formed of different materials having different coefficients of thermal expansion combine to control the expansion of the blade outer air seals to, in turn, control the clearance with the blade.

Both the blade and the blade outer air seal are provided with cooling air.

Traditionally, a turbine rotated at the same speed as the fan rotor. More recently, it has been proposed to include a gear reduction between a fan drive turbine and the fan rotor. With this change, the pressures and temperatures seen across the turbine sections have increased.

Thus, to drive cooling air into the turbine, the cooling air must be at a higher pressure than in the past. The highest pressure in the gas turbine engine is that downstream of a high pressure compressor. However, this cooling air is also at relatively high temperatures.

Thus, it has been proposed to tap high pressure air from a location downstream of the high pressure compressor and pass it through a heat exchanger prior to being delivered to the turbine section for cooling.

It has also been proposed to tap lower pressure from a more forward station in the compressor. The air is ducted to a separate auxiliary compressor and one or more heat exchangers to increase pressure and decrease the temperature of the air.

SUMMARY OF THE INVENTION

A gas turbine engine according to an example of the present disclosure include a compressor section, a combustor, and a turbine section. The combustor has a radially outer surface that defines a diffuser chamber radially outwardly of the combustor. The turbine section has a high pressure turbine first stage blade that has an outer tip, and a blade outer air seal positioned radially outwardly of the outer tip. A tap for tapping air has been compressed by the compressor and is passed through a heat exchanger. The air downstream of the heat exchanger passes through at least one pipe and into a manifold radially outward of the blade outer air seal, and then passes across the blade outer air seal to cool the blade outer air seal.

In a further embodiment of any of the foregoing embodiments, the air downstream of the heat exchanger passes into a mixing chamber and is mixed with higher temperature air from a diffuser chamber outwardly of the combustor, and mixed and passes to cool a first stage blade row in a high pressure turbine.

In a further embodiment of any of the foregoing embodiments, the compressor diffuser chamber has an outer boundary defined by an outer core housing and the pipes are radially outward of the outer core housing.

In a further embodiment of any of the foregoing embodiments, the pipes communicate with the supply of cooled high pressure air at a location upstream of the mixing chamber such that air delivered to the manifold does not include hot air from the diffuser chamber.

In a further embodiment of any of the foregoing embodiments, the manifold is also outwardly of the outer core housing and communicates with passages passing through the outer core housing to the blade outer air seal.

In a further embodiment of any of the foregoing embodiments, the passages passing through the housing extend to a radially outer surface of the blade outer air seal and flow in both upstream and downstream locations around the blade outer air seal.

In a further embodiment of any of the foregoing embodiments, the air flowing upstream of the blade outer air seal is routed through holes in a seal portion of the blade outer air seal to cool adjacent a leading edge of the blade outer air seal and the air passing downstream of the blade outer air seal passing through holes in the seal portion of the blade outer air seal to cool adjacent a trailing edge of the blade outer air seal.

In a further embodiment of any of the foregoing embodiments, the blade outer air seal includes at least two components having different thermal coefficients of expansion to provide clearance control between an outer periphery of the blades and an inner periphery of the seal portion.

In a further embodiment of any of the foregoing embodiments, the mixing chamber is radially outward of a compressor diffuser defined downstream of a downstream most location in a high pressure compressor section and the air from the mixing chamber passes through vanes in the compressor diffuser.

In a further embodiment of any of the foregoing embodiments, the cooling air is tapped from a location downstream of a downstream most location in a high pressure compressor.

In a further embodiment of any of the foregoing embodiments, the air is tapped from a location upstream of a downstream most location in the compressor section.

In a further embodiment of any of the foregoing embodiments, the manifold is also outwardly of the outer core housing and communicates with passages passing through the outer core housing to the blade outer air seal.

In a further embodiment of any of the foregoing embodiments, the compressor diffuser chamber has an outer boundary defined by an outer core housing and the pipes are radially outward of the outer core housing.

In a further embodiment of any of the foregoing embodiments, the pipes communicate with the supply of cooled high pressure air at a location upstream of the mixing chamber such that air delivered to the manifold does not include hot air from the diffuser chamber.

In a further embodiment of any of the foregoing embodiments, the manifold is also outwardly of the outer core housing and communicates with passages passing through the outer core housing to the blade outer air seal.

In a further embodiment of any of the foregoing embodiments, the passages passing through the housing extend to a radially outer surface of the blade outer air seal and flow in both upstream and downstream locations around the blade outer air seal.

In a further embodiment of any of the foregoing embodiments, the air flowing upstream of the blade outer air seal being routed through holes in a seal portion of the blade outer air seal to cool adjacent a leading edge of the blade outer air seal and the air passing downstream of the blade outer air seal passing through holes in the seal portion of the blade outer air seal to cool adjacent a trailing edge of the blade outer air seal.

In a further embodiment of any of the foregoing embodiments, the mixing chamber is radially outward of a compressor diffuser defined downstream of a downstream most location in a high pressure compressor section and the air from the mixing chamber passing through vanes in the compressor diffuser.

In a further embodiment of any of the foregoing embodiments, the blade outer air seal includes at least two components that have different thermal coefficients of expansion to provide clearance control between an outer periphery of the blades and an inner periphery of the seal portion.

In a further embodiment of any of the foregoing embodiments, a valve controls the air passing across the blade outer air seal, and allows control of at least one of an amount, a pressure or a temperature of the air being delivered to the blade outer air seal.

These and other features may be best understood from the following drawings and specification.

DETAILED DESCRIPTION

Figure 1:
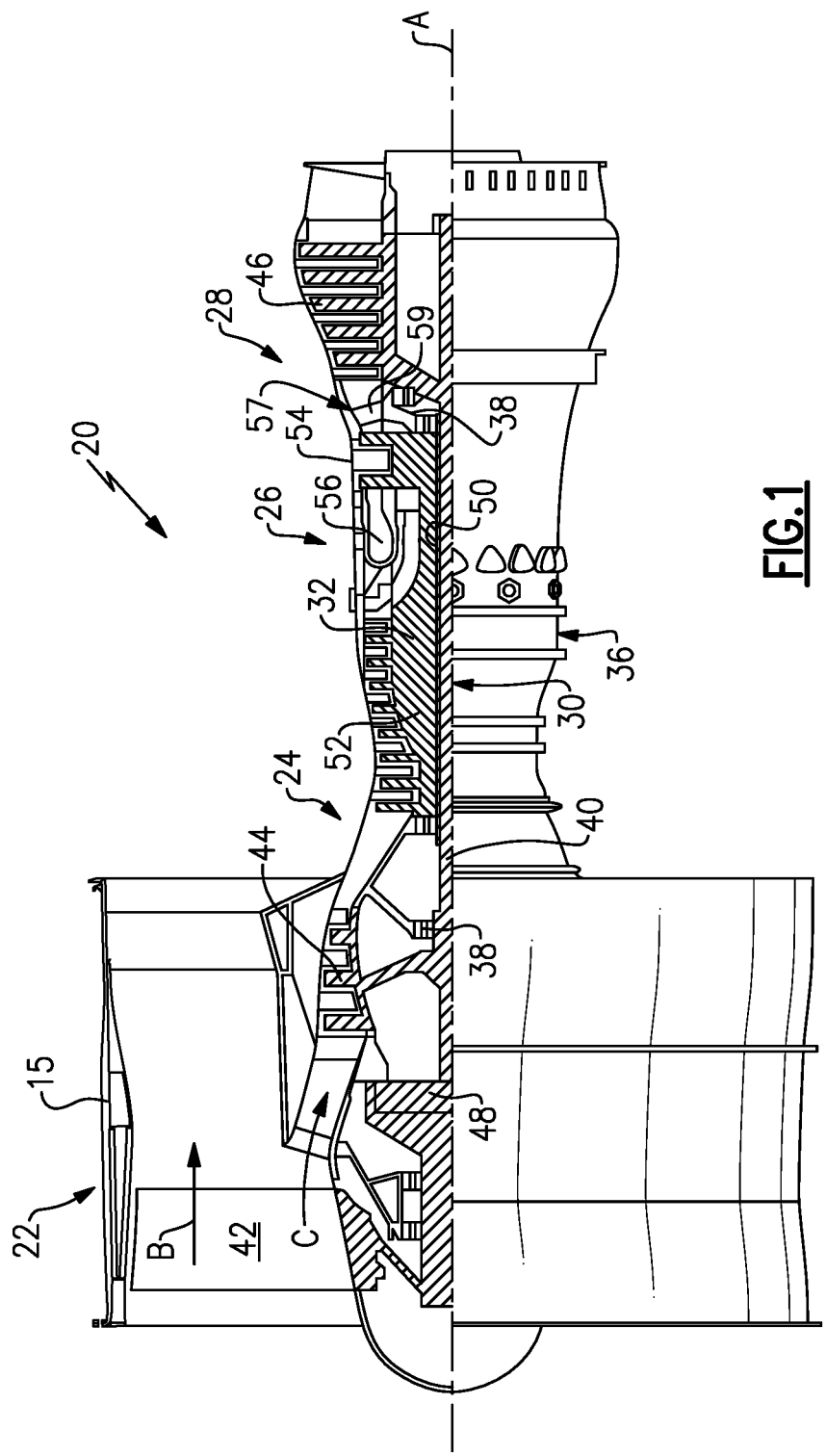
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

Figure 2:
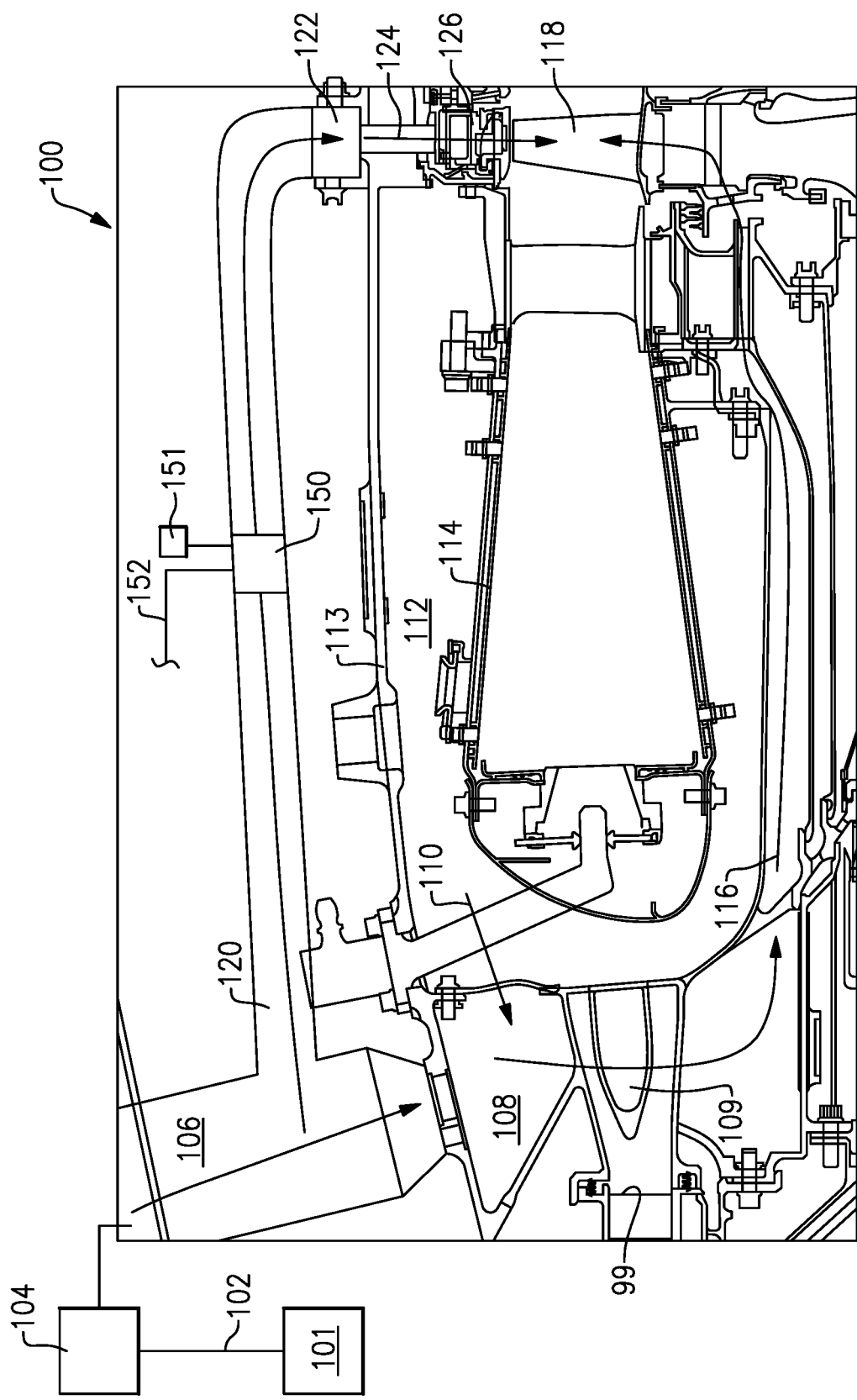
FIG. 2 shows a cooling system.

FIG. 2 shows a cooling system 100 for cooling turbine components. As shown, a compressor section 101 is provided with a tap 102 for tapping pressurized air.

The tap 102 may be at a location upstream from a downstream most portion of a high pressure compressor, in which case, it is typically provided with a boost compressor to raise its pressure. Alternatively, the air can be tapped from a location 99 where it has been fully compressed by the high pressure compressor.

In either case, pressurized air passes through a heat exchanger 104 where it is cooled, such as by air. In one embodiment, the heat exchanger 104 may be in the bypass duct as described in FIG. 1. From heat exchanger 104, air passes into conduit 106.

From the conduit 106, the air passes into a mixing chamber 108, which may be outward of a compressor diffuser 109. The air passes through vanes in the compressor diffuser 109, such that it is separate from the air downstream of a downstream most compression point 99. The air passes, as shown at 116, to cool a turbine blade 118. In the mixing chamber 108, hot air is shown at 110 mixing with the cool high pressure air from the conduit 106. This air is from a diffuser chamber 112, and is at the pressure downstream of the downstream most point 99. As such, it mixes easily with the air in the mixing chamber such that the air delivered at 116 is not unduly cool.

The chamber 112 is outward of a combustion chamber 114. An outer core housing 113 is positioned outwardly of the chamber 112.

A plurality of pipes 120 (only one of which is shown) tap air from the conduit 106 upstream of the mixing chamber 108. As such, this air is entirely the cooled high pressure cooling air. The air from the plurality of pipes is delivered into a manifold 122 which extends circumferentially over more than 270° about an axis of rotation of the engine. In embodiments, the manifold 122 extends over 360° about the axis of rotation. That air then passes through a plurality of pipes 124 to cool a blade outer air seal 126.

A valve 150 is shown schematically. The valve 150 may be controlled by a control 151 to control the cooling air being sent to the blade outer air seal 126. As an example, the valve may control the amount, pressure or temperature of the air being delivered to the blade outer air seal 126. An optional line 152 may selectively bypass the heat exchanger 104 to allow temperature control, as an example.

Figure 3:
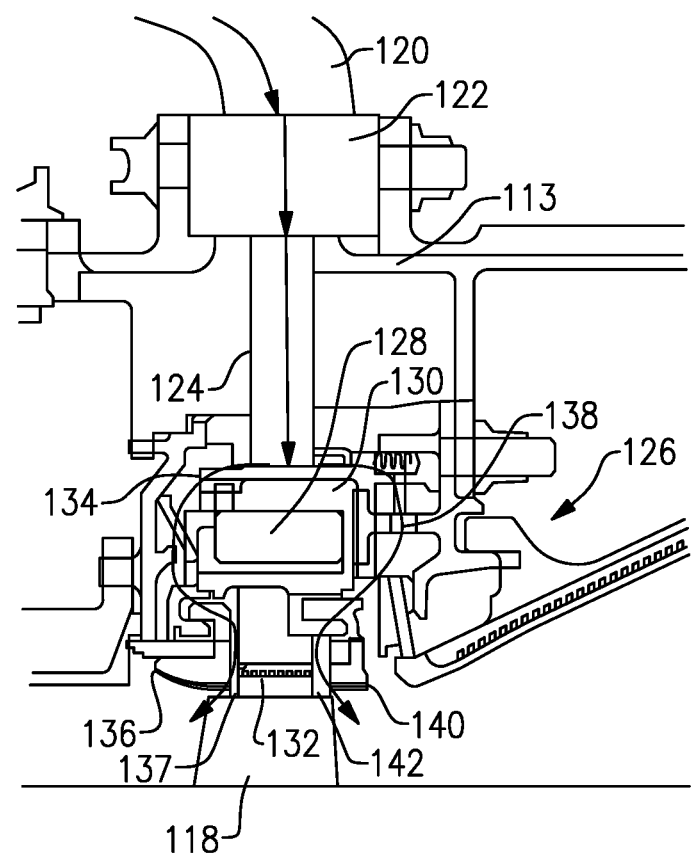
FIG. 3 shows details of a blade outer air seal cooling system.

FIG. 3 shows details. As shown, air from the pipes 120 enters manifold 122 and then flows through pipe 124 to the blade outer air seal 126. The blade outer air seal 126 is shown to have components 128 and 130 which are formed of materials having distinct coefficients of thermal expansion. These components expand at different rates in response to exposure to heat and provide clearance control for a clearance between an inner portion of a seal 132 and an outer tip of the first stage high pressure turbine blade 118 as known.

As shown, the air flows at 134 upstream of the blade outer air seal components 128 and 130 and through holes 137 to cool a leading edge 136 of the seal portion 132. This cooling air drives, or controls, the expansion of the components and thus the clearance control.

Similarly, the air flows at 138 downstream of the blade outer air seal and through holes 142 to cool a trailing edge 140 of the blade outer air seal.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section, a combustor, and a turbine section, said combustor having a radially outer surface defining a diffuser chamber radially outwardly of said combustor;
said turbine section including a high pressure turbine first stage blade having an outer tip, and a blade outer air seal positioned radially outwardly of said outer tip;
a tap for tapping air having been compressed by said compressor section and being passed through a heat exchanger;
a portion of said air downstream of said heat exchanger passing through at least one pipe and into a manifold radially outward of said blade outer air seal, and then passing across said blade outer air seal to cool said blade outer air seal;
wherein another portion of said air downstream of said heat exchanger passes into a mixing chamber and is mixed with higher temperature air from said diffuser chamber outwardly of said combustor, and mixed and passed to cool a first stage blade row in a high pressure turbine; and
wherein said mixing chamber is radially outward of a compressor diffuser defined downstream of a downstream most location in a high pressure compressor section and said air from said mixing chamber passing through vanes in said compressor diffuser.

2. The gas turbine engine as set forth in claim 1, wherein said diffuser chamber has an outer boundary defined by an outer core housing and said at least one pipe is radially outward of said outer core housing.

3. The gas turbine engine as set forth in claim 2, wherein said at least one pipe communicate to supply cooled high pressure air at a location upstream of said mixing chamber such that said portion of said air delivered to said manifold does not include hot air from said diffuser chamber.

4. The gas turbine engine as set forth in claim 2, wherein said manifold is also outwardly of said outer core housing and communicates with passages passing through said outer core housing to said blade outer air seal.

5. The gas turbine engine as set forth in claim 4, wherein said passages passing extend to a radially outer surface of said blade outer air seal and flow in both upstream and downstream locations around said blade outer air seal.

6. The gas turbine engine as set forth in claim 4, wherein air flowing upstream of said blade outer air seal being routed through holes in a seal portion of said blade outer air seal to cool adjacent a leading edge of said blade outer air seal and air passing downstream of said blade outer air seal passing through holes in said seal portion of said blade outer air seal to cool adjacent a trailing edge of said blade outer air seal.

7. The gas turbine engine as set forth in claim 6, wherein said blade outer air seal includes at least two components having different thermal coefficients of expansion to provide clearance control between an outer periphery of turbine blades and an inner periphery of said seal portion.

8. The gas turbine engine as set forth in claim 6, wherein said tap is from a location downstream of a downstream most location in a high pressure compressor.

9. The gas turbine engine as set forth in claim 6, wherein said air is tapped from a location upstream of a downstream most location in said compressor section.

10. The gas turbine engine as set forth in claim 9, wherein said diffuser chamber has an outer boundary defined by said outer core housing and said at least one pipe is radially outward of said outer core housing.

11. The gas turbine engine as set forth in claim 10, wherein said at least one pipe communicates to supply cooled high pressure air at a location upstream of said mixing chamber such that air delivered to said manifold does not include hot air from said diffuser chamber.

12. The gas turbine engine as set forth in claim 11, wherein said manifold is also outwardly of said outer core housing and communicates with passages passing through said outer core housing to said blade outer air seal.

13. The gas turbine engine as set forth in claim 12, wherein said passages extend to a radially outer surface of said blade outer air seal and flow in both upstream and downstream locations around said blade outer air seal.

14. The gas turbine engine as set forth in claim 13, wherein air flowing upstream of said blade outer air seal being routed through holes in the seal portion of said blade outer air seal to cool adjacent a leading edge of said blade outer air seal and air passing downstream of said blade outer air seal passing through holes in said seal portion of said blade outer air seal to cool adjacent a trailing edge of said blade outer air seal.

15. The gas turbine engine as set forth in claim 1, wherein said manifold is also outwardly of said outer core housing and communicates with passages passing through said outer core housing to said blade outer air seal.

16. The gas turbine engine as set forth in claim 1, wherein said blade outer air seal includes at least two components having different thermal coefficients of expansion to provide clearance control between an outer periphery of turbine blades and an inner periphery of said seal portion.

17. The gas turbine engine as set forth in claim 16, wherein a valve controls the air passing across said blade outer air seal, and allows control of at least one of an amount, a pressure or a temperature of the air being delivered to the blade outer air seal.

18. A gas turbine engine comprising:
a compressor section, a combustor, and a turbine section, said combustor having a radially outer surface defining a diffuser chamber radially outwardly of said combustor;
said turbine section including a high pressure turbine first stage blade having an outer tip, and a blade outer air seal positioned radially outwardly of said outer tip;
a tap for tapping air having been compressed by said compressor section and being passed through a heat exchanger;
a portion of said air downstream of said heat exchanger passing through at least one pipe and into a manifold radially outward of said blade outer air seal, and then passing across said blade outer air seal to cool said blade outer air seal;
wherein another portion of said air downstream of said heat exchanger passes into a mixing chamber and is mixed with higher temperature air from said diffuser chamber outwardly of said combustor, and mixed and passed to cool a first stage blade row in a high pressure turbine;
said diffuser chamber has an outer boundary defined by an outer core housing and said at least one pipe is radially outward of said outer core housing;
wherein said manifold is also outwardly of said outer core housing and communicates with passages passing through said outer core housing to said blade outer air seal;
wherein air flowing upstream of said blade outer air seal being routed through holes in a seal portion of said blade outer air seal to cool adjacent a leading edge of said blade outer air seal and air passing downstream of said blade outer air seal passing through holes in said seal portion of said blade outer air seal to cool adjacent a trailing edge of said blade outer air seal; and
wherein said mixing chamber is radially outward of a compressor diffuser defined downstream of a downstream most location in a high pressure compressor section and air from said mixing chamber passing through vanes in said compressor diffuser.

* * * * *